(12) United States Patent
Hobaugh, II

(10) Patent No.: US 6,200,225 B1
(45) Date of Patent: Mar. 13, 2001

(54) VARIABLE LENGTH SHAFT ASSEMBLY HAVING A BEARING SYSTEM

(75) Inventor: James M. Hobaugh, II, Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/148,678

(22) Filed: Sep. 4, 1998

(51) Int. Cl.⁷ .................................................. F16D 3/06
(52) U.S. Cl. ............................................. 464/167; 384/49
(58) Field of Search .................................. 384/49, 48, 54, 384/51; 464/162, 167, 168, 182, 124

(56) References Cited

U.S. PATENT DOCUMENTS

| | | | |
|---|---|---|---|
| 2,532,754 | * 12/1950 | Beck, Sr. | 464/167 |
| 2,787,144 | * 4/1957 | Chauvel | 464/167 |
| 4,138,167 | 2/1979 | Ernst et al. | |
| 4,254,639 | * 3/1981 | Teramachi | 464/167 |
| 4,524,671 | * 6/1985 | Bender et al. | 384/51 X |
| 4,705,491 | 11/1987 | Andersson . | |
| 4,741,723 | * 5/1988 | Orain | 384/49 X |
| 4,805,478 | 2/1989 | Beauch . | |
| 5,213,546 | * 5/1993 | Schneider | 464/124 X |
| 5,460,574 | 10/1995 | Hobaugh . | |

FOREIGN PATENT DOCUMENTS

1266350 * 5/1961 (FR) .

* cited by examiner

Primary Examiner—Lynne H. Browne
Assistant Examiner—Greg Binda
(74) Attorney, Agent, or Firm—Tarolli, Sundheim, Covell, Tummino & Szabo L.L.P.

(57) ABSTRACT

A shaft assembly (10) includes an outer shaft (12) having a plurality of grooves (64–72) which extend between opposite end portions of the outer shaft. An inner shaft (14) has a plurality of projections (82–90) which extend between opposite end portions of the inner shaft. A plurality of bearing assemblies (22–30) cooperate with the grooves (64–72) in the outer shaft (12) and the projections (82–90) on the inner shaft (14) to support the inner and outer shafts for axial movement relative to each other. The bearing assemblies (22–30) includes rotatable bearing members (42) which are disposed between longitudinally extending side surfaces of the grooves (64–72) in the outer (12) shaft and a longitudinally extending side surfaces of projections (82–90) on the inner shaft (14). The bearing members (42) are rotatably mounted in slots (108) disposed in retainer strips (100).

1 Claim, 4 Drawing Sheets

VARIABLE LENGTH SHAFT ASSEMBLY HAVING A BEARING SYSTEM

BACKGROUND OF THE INVENTION

The present invention relates to a shaft assembly which includes coaxial shafts disposed in a telescopic relationship.

A shaft assembly having shafts which are disposed in a telescopic relationship is disclosed in U.S. Pat. No. 5,460,574. This known shaft assembly includes a bushing for transmitting torque between the shafts. The bushing is disposed in sliding engagement with side surfaces of grooves disposed in an outer shaft. The bushing is also disposed in sliding engagement with projections on the inner shaft.

SUMMARY OF THE INVENTION

The present invention relates to a shaft assembly having an outer shaft with a plurality of grooves and an inner shaft which is at least partially disposed within the outer shaft. The inner shaft has a plurality of projections which are at least partially disposed in the grooves in the outer shaft. A plurality of bearing assemblies support the inner and outer shafts for axial movement relative to each other.

The bearing assemblies which support the shafts for axial movement relative to each other include rotatable bearing members. The bearing members have circular outer side surfaces which are disposed in rolling engagement with longitudinally extending side surfaces of the grooves in the outer shaft and with longitudinally extending side surfaces of the projections on the inner shaft. The bearing members are effective to transmit force between the longitudinally extending side surfaces of the grooves in the outer shaft and the longitudinally extending side surfaces of the projections on the inner shaft.

Each of the bearing assemblies includes a retainer strip having a plurality of spaced apart slots. Each of the bearing members is disposed in a slot in a retainer strip in one of the bearing assemblies.

BRIEF DESCRIPTION OF THE DRAWINGS

The foregoing and other features of the present invention will become more apparent to one skilled in the art to which the present invention relates upon consideration of the following description of the invention with reference to the accompanying drawings wherein.

DESCRIPTION OF A PREFERRED EMBODIMENT

Figure 1:
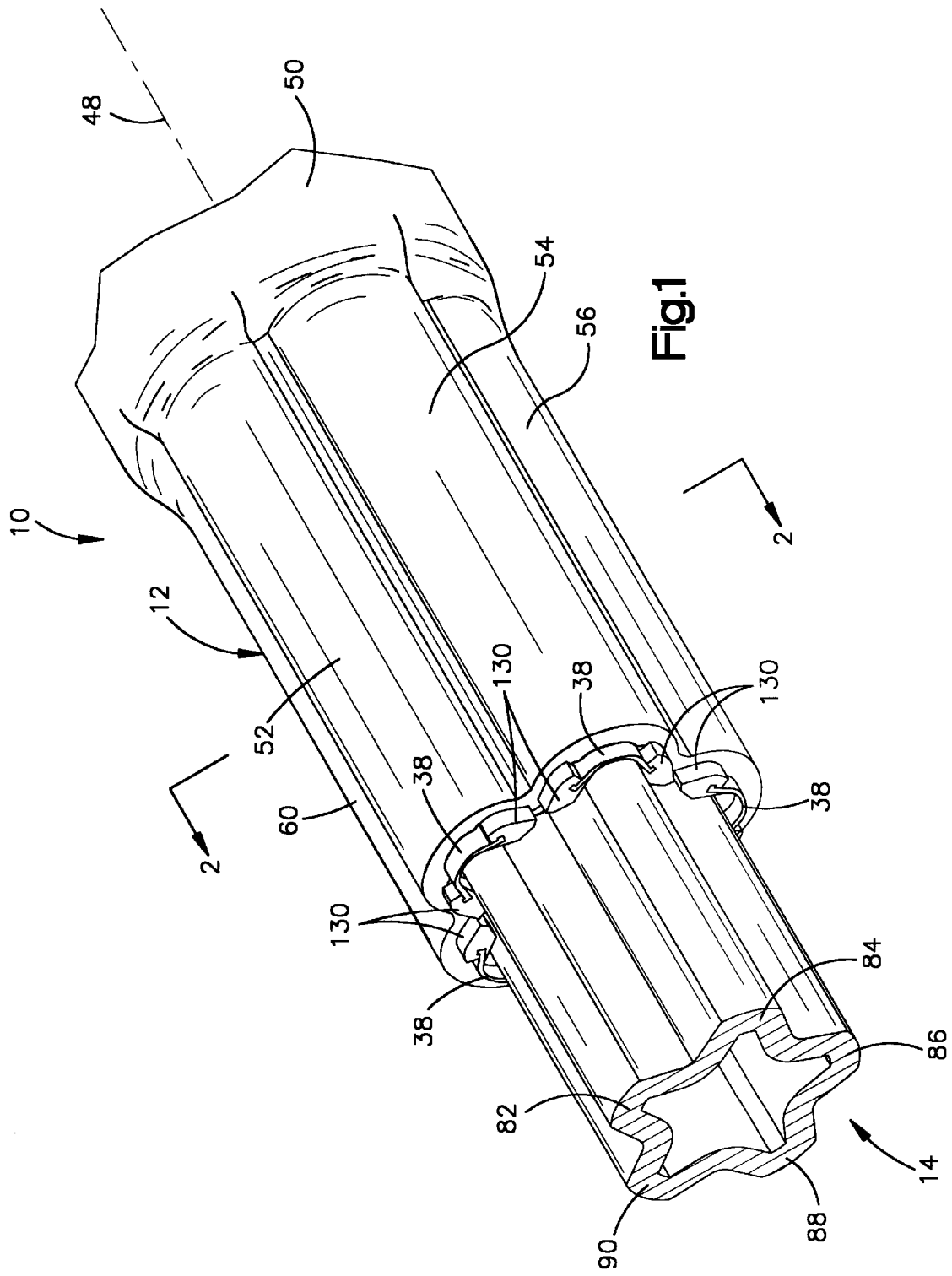
FIG. 1 is a partially broken away view of a shaft assembly constructed in accordance with the present invention.

A shaft assembly 10 constructed in accordance with the present invention is illustrated in FIG. 1. The shaft assembly 10 includes an outer shaft 12 and an inner shaft 14. The inner shaft 14 is telescopically received in the outer shaft 12. A bearing system 16 (FIG. 2) is provided to support the outer shaft 12 and inner shaft 14 for movement relative to each other.

Figure 2:
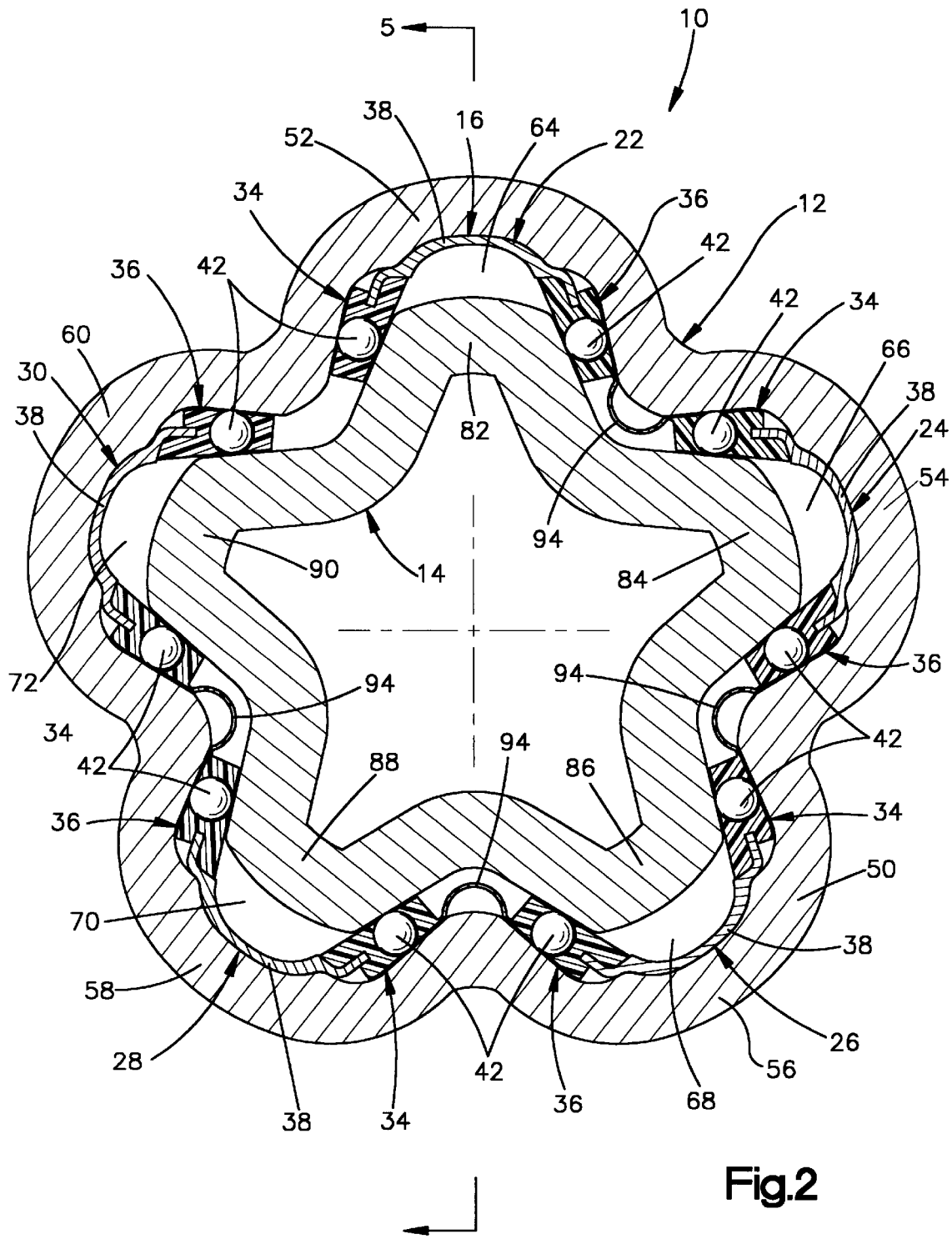
FIG. 2 is a sectional view, taken generally along the line 2—2 of FIG. 1, illustrating the relationship between an inner shaft, an outer shaft, and a plurality of bearing assemblies.

The bearing system 16 includes a plurality of identical bearing assemblies 22, 24, 26, 28 and 30 (FIG. 2). The bearings assemblies 22–30 are disposed in a circular array between the outer shaft 12 and inner shaft 14. Each of the bearing assemblies 22–30 includes a first or left (as viewed in FIG. 2) bearing unit 34 and a second or right bearing unit 36. The left and right bearing units 34 and 36 are interconnected by positioning elements 38. The positioning elements 38 retain the bearing units 34 and 36 in a predetermined orientation relative to each other and to the shafts 12 and 14.

In accordance with a feature of the present invention, the bearing units 34 and 36 include rotatable bearing members 42. The bearing members 42 are disposed in rolling engagement with the outer shaft 12 and inner shaft 14. The bearing members 42 roll on the outer shaft 12 and inner shaft 14. The bearing members 42 eliminate sliding friction upon axial movement between the shafts 12 and 14.

Outer and Inner Shafts

The outer and inner shafts 12 and 14 (FIG. 1) are formed of metal and have a tubular configuration. The outer and inner shafts 12 and 14 are axially movable relative to each other to vary the extent of the telescopic relationship between the shafts. However, the outer and inner shafts 12 and 14 cooperate with the bearing system 16 to prevent relative rotation between the outer and inner shafts about a common central axis 48 of the two shafts.

The outer shaft 12 includes a metal side wall 50 having a plurality of radially outwardly projecting lobes 52, 54, 56, 58, and 60 (FIG. 2) disposed in a circular array. In the illustrated embodiment of the outer shaft 12, the shaft has five equally spaced lobes. However, it is contemplated that the outer shaft 12 could either have greater or lesser number of lobes if desired. The lobes 52–60 define a plurality of grooves 64, 66, 68, 70 and 72 which extend along the inside of the outer shaft 12 and extend between axially opposite end portions of the outer shaft 12. The grooves 64–72 have longitudinal central axes which extend parallel to the longitudinal central axis 48 of the outer shaft 12.

Figure 3:
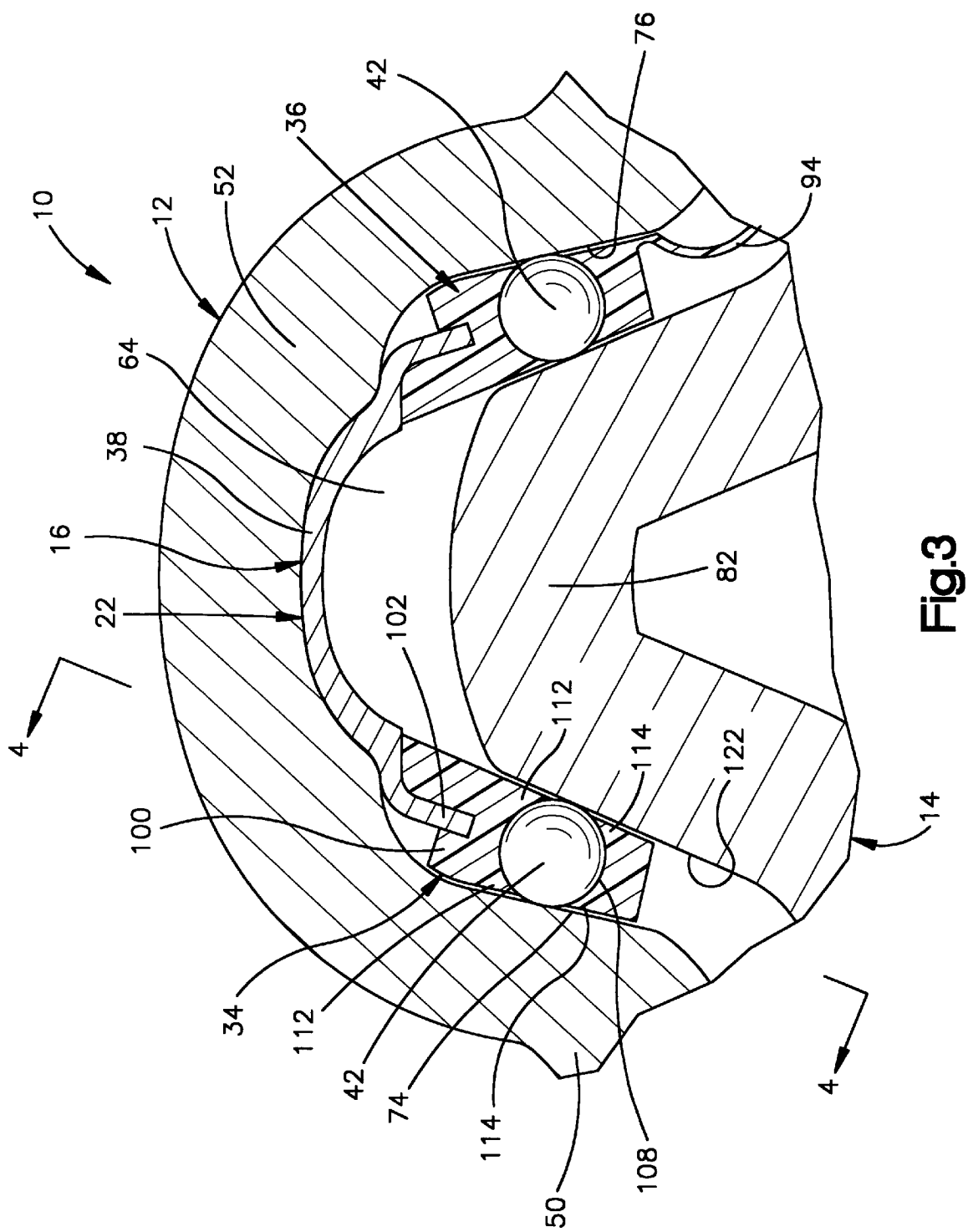
FIG. 3 is an enlarged fragmentary view of a portion of FIG. 2.

The groove 64 (FIG. 3) has a pair of longitudinally extending side surfaces 74 and 76 which are skewed at an acute angle relative to each other. The side surfaces 74 and 76 of the groove 64 extend between axially opposite end portions of the outer shaft 12. Although only the side surfaces 74 and 76 for the groove 64 are illustrated in FIG. 3, the grooves 66, 68, 70 and 72 have a configuration which is the same as the configuration of the groove 64. The grooves 66, 68, 70 and 72 have side surfaces, corresponding to the side surfaces 74 and 76, which extend between axially opposite end portions of the outer shaft 12. The side surfaces 74 and 76 of the grooves 64–72 have central axes which extend parallel to the central axis 48 of the shafts 12 and 14.

The inner shaft 14 has a tubular construction with a plurality of lobes 82, 84, 86, 88, and 90 (FIG. 2). The lobes 82–90 are radially aligned with and project into the grooves 64–72 in the outer shaft 12. In the illustrated embodiment of the invention, the inner shaft 14 has five lobes 82–90. However, the inner shaft 12 could have a greater or lesser number of lobes if desired.

Although it is preferred to form the inner and outer shafts 12 and 14 with the same number of lobes, the inner and outer shafts could have different numbers of lobes if desired.

Regardless of the number of lobes provided on the inner and outer shafts 12 and 14, at least some of the lobes on the inner shaft 14 would project into at least some of the grooves 64–72 formed in the outer shaft 12. By having the lobes 82–90 on the inner shaft 14 project into the grooves 64–72 on the outer shaft 12, relative rotation between the inner and outer shafts about their coincident central axis 48 is blocked. Although the shafts 12 and 14 can not rotate relative to each other, the shafts are relatively movable in an axial direction.

The shafts 12 and 14 have the same general construction as is disclosed in U.S. Pat. No. 5,460,574 issued Oct. 24, 1995 and entitled "Variable Length Shaft Assembly With Lash Bushing". The disclosure in the aforementioned U.S. Pat. No. 5,460,574 is hereby incorporated in its entirety herein by this reference thereto.

Bearing System

The bearing system 16 includes a plurality of bearing assemblies 22–30 (FIG. 2). Each of the bearing assemblies is disposed in one of the grooves 64–72 in the outer shaft 12 and engages one of the lobes or projections 82–90 on the inner shaft 14. The bearing system 16 supports the outer and inner shafts 12 and 14 for axial movement relative to each other. The bearing system 16 cooperates with the grooves 64–72 in the outer shaft 12 and lobes or projections 82–90 on the inner shaft 14 to block relative rotation between the inner and outer shafts.

The bearing assemblies 22–30 are interconnected by strips or hinges 94 (FIG. 2). The strips or hinges 94 are flexible and enable the orientation of the bearing assemblies 22–30 to be changed relative to each other to accommodate the configuration of the shafts 12 and 14. The hinges 94 interconnect the bearing assemblies 22–30 to form a unitary bearing system 16.

The bearing assembly 22 (FIG. 3) includes left and right bearing units 34 and 36 which are interconnected by a positioning element 38. The positioning element 38 extends for substantially the entire length of the groove 64 in the outer shaft 12. The positioning element 38 is formed of spring steel and is resiliently deflected by being positioned in the groove 64 in the outer shaft 12.

The resiliently deflected positioning element 38 urges the left and right bearing units toward the side surfaces 74 and 76 of the groove 64. The radially outer side surface of the positioning element 38 has an arcuate configuration and cooperates with the groove 64 to position the left and right bearing units 34 and 36 in the groove and to hold the bearing units in place.

Figure 4:
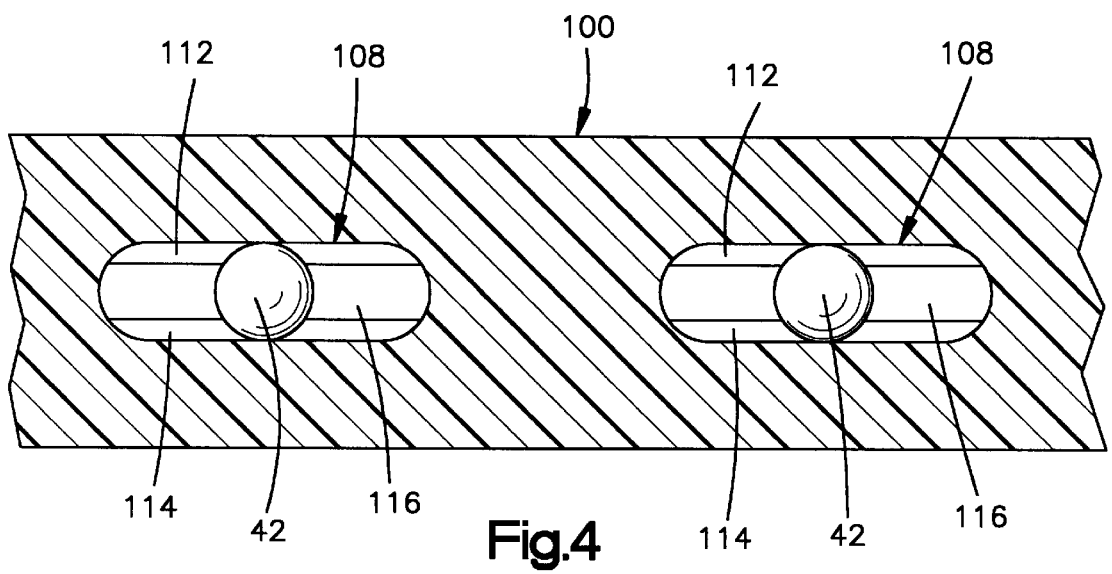
FIG. 4 is a fragmentary sectional view, taken generally along the line 4—4 of FIG. 3, illustrating the relationship of a plurality of rotatable bearing members to slots formed in a retainer strip.

The left bearing unit 34 includes a retainer strip 100 (FIGS. 3 and 4). The retainer strip 100 is molded around and fixedly connected with a longitudinally extending edge portion 102 (FIG. 3) of the positioning element 38. The molded interconnection between the edge portion 102 of the positioning element 38 and the retainer strip 100 holds the retainer strip against movement relative to the positioning element 38. The retainer strip 100 is formed of a polymeric material having a low coefficient of friction.

A plurality of slots 108 (FIG. 4) are molded in the retainer strip 100 to receive the bearing members 42. In the illustrated embodiment of the invention, the bearing members 42 are steel balls having a spherical configuration. The molded slots 108 have a cross-sectional configuration (FIG. 3) corresponding to the configuration of the bearing members 42 to enable the retainer strip 100 to engage the bearing members 42 and hold the bearing members in the slots. After the retainer strip 100 has been molded on the edge portion 102 of the positioning element 38, the bearing members 42 are snapped into the slots 108 and held in place by parallel lips or edge portions 112 and 114 which extend throughout the length of the slots (FIG. 4).

The spherical bearing members 42 project into a gap or slot 116 (FIG. 4) formed between the longitudinally extending lips or edge portions 112 and 114. The lips 112 and 114 cooperate to hold the bearing members 42 in the slots 108. However, the lips 112 and 114 are sufficiently thin to enable the bearing members to deflect the lips and snap into the slots 108 once the slots have been molded in the retainer strip 100.

The bearing members 42 project from opposite sides of the retainer strip 100 (FIG. 3). This enables the circular outer side surface of the spherical bearing members 42 to roll along both the side surface 74 of the groove 64 (FIG. 3) in the outer shaft 12 and along a side surface 122 on the lobe or projection 82 on the inner shaft 14. The side surface 122 on the lobe or projection 82 on the inner shaft 14 has a longitudinal central axis which extends parallel to a longitudinal central axis of the side surface 74 on the groove 64 in the outer shaft 12.

The spherical bearing members 42 are freely rotatable in the slots 108 in the retainer strip 100 (FIGS. 3 and 4). Therefore, during axial movement between the inner and outer shafts 12 and 14 (FIG. 3), the bearing members 42 have rolling engagement with the inner side surface 74 of the groove 64 in the outer shaft 12 and with the outer side surface 122 of the lobe 82 on the inner shaft 14. This rolling engagement of the bearings 42 with the outer side surface 122 on the inner shaft 14 and the inner side surface 74 on the outer shaft 12 enables the inner and outer shafts to be freely moved axially relative to each with a minimum of resistance.

Each of the bearing members 42 is disposed in a separate slot 108 in the retainer strip 100 (FIG. 4). Upon axial movement between the inner and outer shafts 12 and 14, the bearing members roll along the slots 108 and along surfaces on the inner and outer shafts 12 and 14. The slots 108 in the retainer strip 100 are spaced apart from each other so that the bearing members 12 do not impact against each other.

The slots 108 have coincident longitudinal central axes which extend parallel to the longitudinal central axis 48 of the inner and outer shafts 12 and 14. Therefore, when there is axial movement between the inner and outer shafts 12 and 14, the bearing members 42 tend to roll along the slots 108 in the retainer strips 100. However, even though the bearing members 42 roll along the slots 108 in the retainer strip 100, the bearing members do not impact against each other.

In the illustrated embodiment of the invention, the bearing members 42 are balls having a spherical configuration. This spherical configuration enables the circular outer side surface of the bearing members 42 to roll on surfaces of the inner and outer shafts 12 and 14. However, it is contemplated that the bearing members 42 could have a different configuration if desired. For example, the bearing members 42 could have a cylindrical configuration. Alternatively, the bearing members could have a configuration corresponding to the configuration of a portion of a cone.

If the bearing members 42 had a cylindrical or conical configuration, it is contemplated that the bearing members could be positioned in the retainer strip 100 with the longitudinal central axes of the bearing members extending perpendicular to a longitudinal central axis of the bearing strip 100 and to the central axis 48 of the inner and outer shafts 12 and 14. If desired, the slots 108 in the retainer strip 100 could be sized so as to allow only minimal movement of the bearing members 42 along the longitudinal axis of the retainer strip 100. The bearing members 42 may be mounted in cages which hold the bearing members against movement along the longitudinal axis of the retainer strip 100.

Although only the retainer strip 100 and bearing members 42 for the left bearing unit 34 are illustrated in FIG. 4, it should be understood that the right bearing unit 36 (FIG. 3) has a retainer strip which is a mirror image of the retainer strip 100 and supports a plurality of bearing members 42 in the same manner as the bearing strip 100. The retainer strip for the right bearing unit 36 is integrally molded as one piece with the hinge 94.

Although only the bearing assembly 22 is illustrated in FIG. 3, it should be understood that the bearing assemblies 24, 26, 28 and 30 have the same construction as the bearing assembly 22. The identical bearing assemblies 22–30 cooperate with each other and the outer and inner shafts 12 and 14 to support the outer and inner shafts for axial movement relative to each other. The inner and outer shafts are supported for axial movement relative to each other by rolling engagement of the bearing members 42 in the bearing assemblies 22–30 with inner side surfaces of the grooves 64–72 in the outer shaft 12 and outer side surfaces of the lobes or projections 82–90 on the inner shaft 14.

A plurality of flange segments 130 are provided at the axially outer (left as viewed in FIG. 1) ends of the positioning elements 38. The flange segments 130 are molded of a polymeric material and engage one end, that is the left end as viewed in FIG. 1, of the outer shaft 12 to hold the bearing system 16 against rightward (as viewed in FIG. 1) movement relative to the outer shaft 12.

Figure 5:
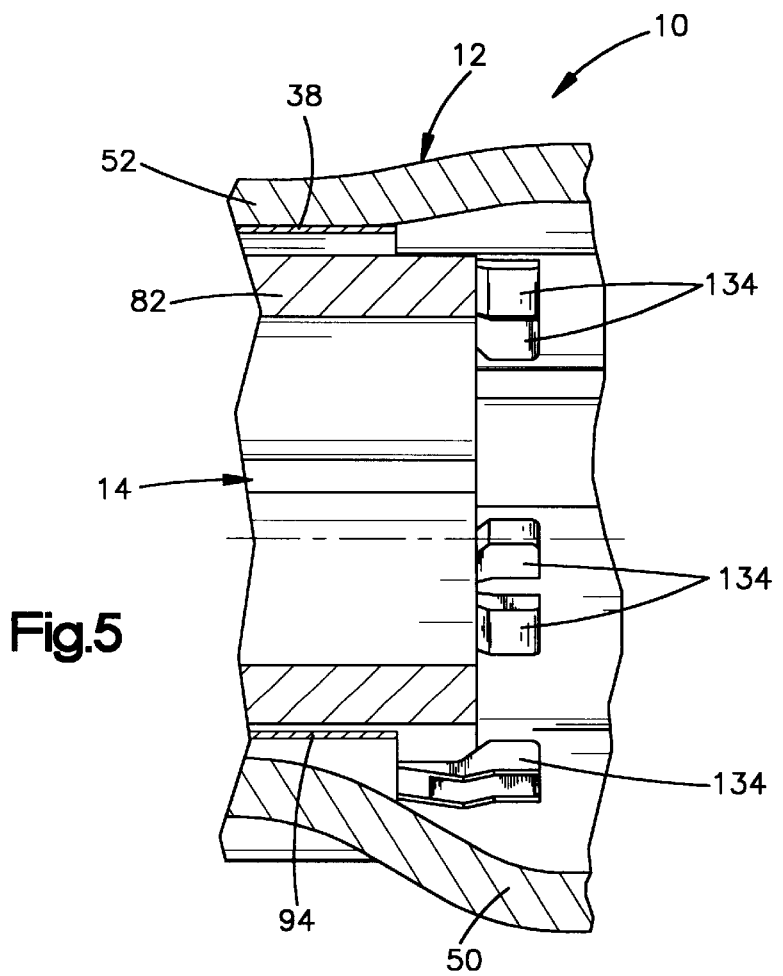
FIG. 5 is a fragmentary sectional view, taken along the line 5—5 of FIG. 2.

Tangs 134 (FIG. 5) are connected with the ends of the positioning elements 38 opposite from the end where the flange segments 130 (FIG. 1) are connected. The tangs 134 (FIG. 5) are molded of a suitable polymeric material. The tangs 134 cooperate with a cylindrical end portion 50 of the outer shaft 12 to hold the bearing system 16 against leftward (as viewed in FIG. 5) axial movement relative to the outer shaft. The flange segments 130 and tangs 134 cooperate with opposite end portions of the outer shaft 12 to hold the bearing system 16 against axial movement relative to the outer shaft. The construction and manner in which the flange segments 130 and tangs 134 cooperate with the outer shaft 12 is the same as is disclosed in the aforementioned U.S. Pat. No. 5,460,574 which has been incorporated herein by reference thereto.

From the above description of the invention, those skilled in the art will perceive improvements, changes and modifications. Such improvements, changes and modifications within the skill of the art are intended to be covered by the appended claims.

Having described the invention, the following is claimed:

1. A shaft assembly comprising:

an outer shaft having a plurality of grooves extending parallel to a longitudinal central axis of said outer shaft;

an inner shaft at least partially disposed within said outer shaft, said inner shaft having a plurality of projections extending parallel to a longitudinal central axis of said inner shaft, each of said projections on said inner shaft being at least partially disposed in one of said grooves in said outer shaft; and a plurality of bearing assemblies having the same construction and cooperating with said grooves in said outer shaft and said projections on said inner shaft to support said inner and outer shafts for axial movement relative to each other, said plurality of bearing assemblies include a plurality of rotatable bearing members having circular outer side surfaces disposed in rolling engagement with longitudinally extending side surfaces of said grooves in said outer shaft and longitudinally extending side surfaces of said projections on said inner shaft, and wherein each bearing assembly of said plurality of bearing assemblies includes a retainer strip having a plurality of spaced apart slots, each of said bearing members being disposed in a slot in a retainer strip in one of said bearing assemblies, said retainer strip being formed of a polymeric material having a low coefficient of friction, and wherein said plurality of bearing assemblies are interconnected by flexible hinges to form a unitary bearing system to enable an orientation of said bearing assemblies to be changed relative to each other to accommodate the configuration of said inner shaft and said outer shaft, and wherein each bearing assembly of said plurality of bearing assemblies comprises left and right bearing units interconnected by a positioning element, said positioning element extending for substantially the entire length of said groove in said outer shaft, said positioning element being formed of spring steel and being resiliently deflected by being positioned in one of said grooves in said outer shaft, said resiliently deflected positioning element urging said left and right bearing units toward said side surfaces of said grooves in said outer shaft.

\* \* \* \* \*